United States Patent Office 2,988,026
Patented June 13, 1961

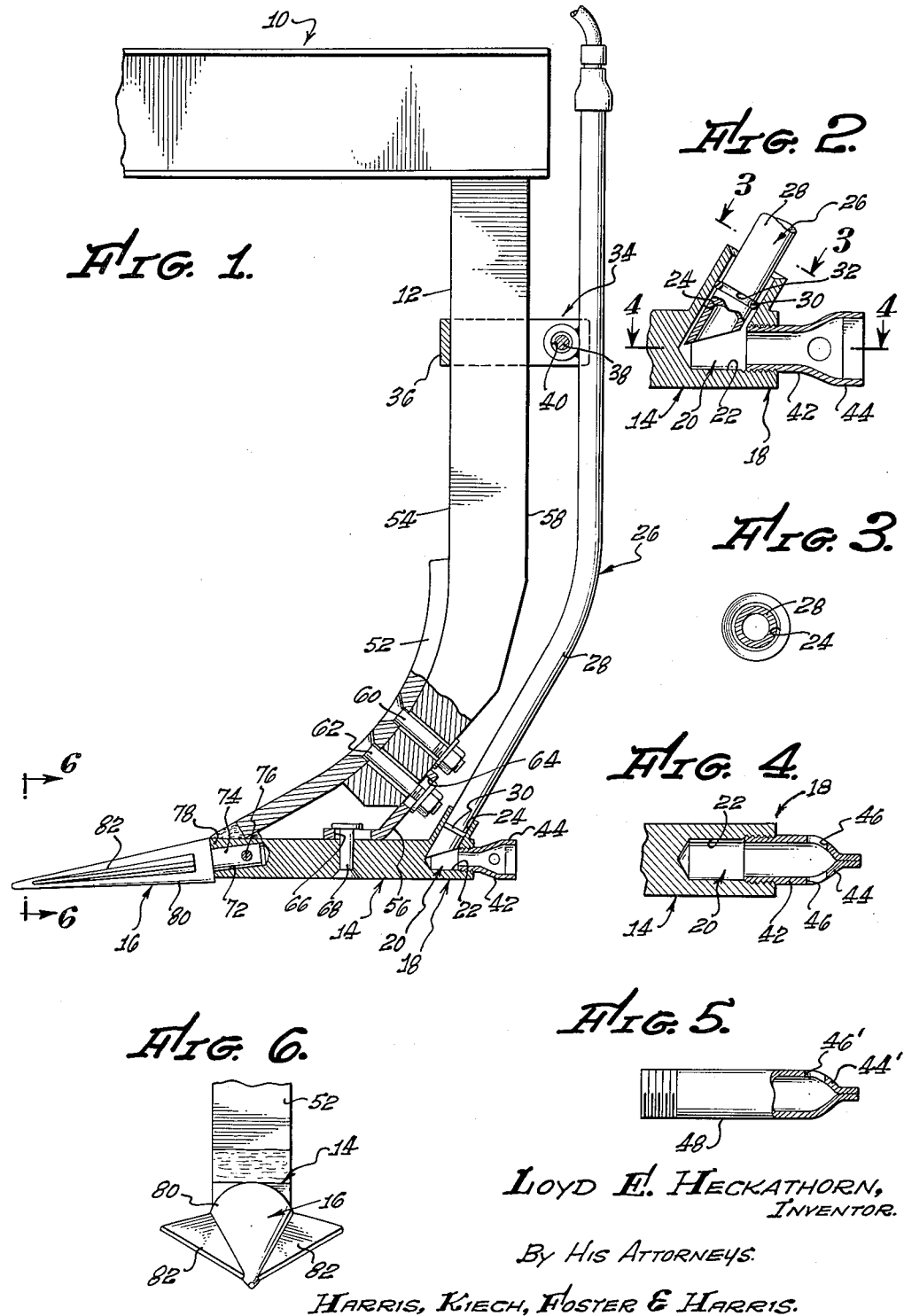

2,988,026
SOIL INJECTION APPARATUS
Loyd E. Heckathorn, Garden Grove, Calif., assignor, by mesne assignments, to Towner Manufacturing Company, Santa Ana, Calif., a corporation of California
Filed June 13, 1955, Ser. No. 515,035
7 Claims. (Cl. 111—7)

The present invention relates in general to a soil injection apparatus and, more particularly, to an apparatus for continuously injecting a material into the earth to alter its characteristics for agricultural or other purposes. For example, the apparatus of the invention may be utilized for injecting fertilizers, soil conditioners, or various other materials.

Materials of the foregoing nature are frequently injected into the earth behind earth penetrating tools running beneath the surface varying distances, the tools being carried by tool shanks which are connected at their upper ends to a frame drawn by suitable traction equipment.

In injecting a gaseous material like anhydrous ammonia, the material is conveyed downwardly to the discharge means rearwardly of the tool through a conduit or conduit means which is preferably located behind the shank and which communicates with the discharge means. In order to prevent the escape of gaseous material upwardly around the exterior of the conduit after discharge from the discharge means, a primary object of the invention is to locate the point of discharge rearwardly of the point of connection of the conduit to the discharge means, and to provide a fluid tight, i.e., liquid-tight and/or gas-tight, seal between the conduit and the discharge means.

More particularly, an object of the invention is to provide a discharge means which includes a socket receiving the lower end of the conduit and sealed with respect thereto by an O-ring, or similar sealing element, and which includes a discharge member or discharge nipple extending rearwardly and provided with one or more discharge openings at a point spaced rearwardly a substantial distance from the point of connection of the conduit to the discharge means.

Another object is to provide a discharge means which is located at the rearward end of a tool holder mounted on the lower end of the shank, and to provide means for loosely connecting the conduit to the shank-holder assembly at two vertically spaced points so that the shank may flex relative to the conduit in use (as when the shank, or a tool carried by the tool holder, encounters obstructions) without damage to the conduit. In this connection, an important object is to loosely connect connect the conduit to the shank-holder assembly at the lowermost of the two points mentioned by means of the O-ring seal between the lower end of the conduit and the discharge means.

Another object is to provide a discharge member or nipple which is designed to resist plugging of the discharge opening or openings therein with earth under any conditions, including reversing of the apparatus in the ground. For this purpose, the discharge nipple is provided with lateral discharge openings and converges rearwardly from the discharge openings, the rearward end of the discharge nipple preferably being generally wedge-shaped.

Another object of the invention is to provide an apparatus of the character described wherein the tool holder is provided with means at its forward end for mounting the tool thereon, is provided with means at its rearward end for receiving the conduit and for mounting the discharge nipple thereon, is provided with means for mounting it on the lower end of the shank, and is provided with means, rigidly connected thereto, for facing the forward side of the shank, adjacent the lower end thereof, to minimize wear of the shank, this being an extremely desirable feature since the shank is an expensive component, ordinarily made of spring steel to permit it to flex when obstructions are encountered. With the foregoing construction, whenever excessive wear of any component of the tool holder assembly has occurred, the entire assembly, including the elements outlined in the foregoing sentence, may be replaced as a unit, which is an important feature of the invention.

Another object is to provide a tool holder having adjustable means for securing it to the lower ends of shanks of different thicknesses. More particularly, an object in this connection is to provide the tool holder with elements respectively adapted to engage the forward and rearward sides of the shank, the rearward element being adjustably positionable relative to both the tool holder proper and to the shank to accommodate shanks of different fore-and-aft thicknesses.

The foregoing objects, advantages, features and results of the present invention, together with various other objects, advantages, features and results thereof which will be apparent, may be attained with the exemplary embodiments of the invention illustrated in the accompanying drawing and described in detail hereinafter. Referring to the drawing:

FIG. 1 is a side elevation, partially in vertical section, of a soil injection apparatus of the invention;

FIG. 2 is an enlarged, fragmentary sectional view duplicating a portion of FIG. 1 and illustrating a discharge means of the invention and a means of the invention for connecting a conduit means to the discharge means in a flexible, but fluid-tight manner;

FIGS. 3 and 4 are sectional views respectively taken along the arrowed lines 3—3 and 4—4 of FIG. 2;

FIG. 5 is a view generally similar to FIG. 4, but illustrating another embodiment of a discharge nipple of the invention; and FIG. 6 is a fragmentary front elevation taken as indicated by the arrowed line 6—6 of FIG. 1 of the drawing.

In the drawing, the numeral 10 designates, fragmentarily, a draft frame which may be drawn by a tractor, not shown, for example. As is well known in the art, it is conventional to provide such a frame with wheels, not shown, for governing the height above the ground at which the frame is maintained, and for thus governing the depth of penetration of tools carried by the frame. Such things being conventional, it is thought unnecessary to disclose them in detail herein.

Connected to and depending from the frame 10 is a tool shank 12 of conventional design, the tool shank being formed of spring steel, or the like, so that it may flex upon encountering obstructions, thereby minimizing the possibility of damage to the equipment.

Connected to the lower end of the shank 12 in a manner to be described is a tool holder 14 of the invention, the tool holder carrying an earth penetrating tool 16 at its forward end and carrying discharge means 18 for a material to be injected into the ground at its rearward end. The discharge means 18, and the manner in which the material to be injected is supplied thereto, will now be considered.

Referring particularly to FIG. 2 of the drawing, the discharge means 18 includes an angular passage 20 through the holder 14 at the rearward end thereof, this passage including an axial, rearwardly extending bore 22 and a lateral, upwardly and rearwardly extending bore or socket 24. A conduit means 26 is provided for conveying the material to be injected downwardly to the discharge means 18 from a suitable container or other source of supply, not shown, carried by the frame 10.

In the case of anhydrous ammonia, the source of supply may be a pressure tank, not shown. The conduit means 26 includes a conduit or pipe 28 which is located behind or rearwardly of the shank 12 and which extends downwardly in substantial parallelism to the shank, the lower end of the conduit extending into the socket 24. A fluid-tight seal between the conduit means 26 and the discharge means 18 is maintained by an O-ring 30 between the conduit 28 and the wall of the socket 24, the O-ring being shown as carried in an annular groove 32 in the conduit. With this construction, leakage between the conduit means 26 and the discharge means 18 is completely eliminated, thereby preventing a gaseous material being injected from flowing back up the outside of the conduit 28 to the surface. As will be discussed in more detail hereinafter, the discharge means 18 includes means for discharging the material being injected at a point a substantial distance to the rear of the point of connection of the conduit means 26 to the discharge means 18 so that the earth closes over the injected material to trap it underground, this being particularly important in the case of a gaseous material.

It will be noted from FIG. 2 of the drawing that the diameter of the socket 24 exceeds the external diameter of the lower end of the conduit 28 therein, the resulting clearance space being closed by the O-ring 30. Thus, the O-ring serves as a means for loosely or flexibly connecting the conduit 28 to the socket 24. A similar loose or flexible connection 34 between the conduit 28 and the shank 12 above the lower end of the shank is provided. The connection 34 includes a clevis 36 which merely loosely embraces and is not attached to the shank 12 and the open end of which is spanned by a pin 38. This pin extends through an eye on the conduit 28, the eye being larger than the pin to provide a loose or flexible connection.

With the foregoing construction, it will be apparent that, when the shank 12 flexes in use, the shank-holder assembly 12—14 may move variably relative to the conduit 28, due to the loose or flexible connection provided by the O-ring 30 and the loose or flexible connection 34. Thus, flexure of the shank 12 will not damage the conduit 28, which is an important feature.

Continuing to consider the discharge means 18, threaded into the rearward end of the axial bore 22 at the rearward end of the holder 14 is a discharge member or nipple 42 which is provided at its rearward extremity with a rearwardly-convergent, generally wedge-shaped portion. In the particular construction shown, the discharge nipple 42 is formed of a length of pipe the rearward end of which is flattened and closed to provide the configuration just described. The convergent rearward portion 44 of the nipple 42 is provided with one or more lateral, preferably horizontally directed, discharge openings 46 located at the larger end of the convergent portion 44. In the embodiment of FIGS. 1 to 4, two large openings 46 are shown, FIG. 4, this construction being preferred where general or widespread application of the injected material is desired. In FIG. 5 of the drawing is shown a discharge nipple 48 which is provided with only one discharge opening 46' on one side thereof and at the larger end of a convergent portion 44' thereof, this embodiment being preferred where localized application of the injected material is desired, as in side dressing row crops with fertilizer, for example.

With either the nipple 42, or the nipple 48, it will be noted that providing the convergent, wedge-shaped portion 44 or 44' and locating the discharge openings 46 or 46' so that they are directed laterally at the larger end of the convergent portion, results in a structure which substantially completely eliminates any possibility of plugging the discharge openings with dirt, even if the frame 10 is backed up with the tool 16 in the ground, which is an important feature.

The discharge nipples 42 and 48 may be of various lengths, a relatively short nipple, exemplified by the nipple 42, being preferable where nongaseous materials are being injected. For gaseous materials, however, a longer nipple, exemplified by the nipple 48, is preferable, to place the discharge point well to the rear of the lower end of the conduit 28. With this arrangement, more time for the earth to close in over the discharged material is provided to trap such material underground and prevent its escape. The length of the nipple utilized will also depend on the nature of the soil being worked, it being desirable to use a longer nipple with hard soil which breaks up into large lumps or clods since soil of this type will not close in over the discharge nipple as rapidly as loose soil.

Considering now other features of the invention, formed integrally with the holder 14, as by being welded thereto, is a facing element 52 which faces the front side 54 of the shank 12, at least over the lower portion thereof. Thus, wear of the shank 12 itself is minimized, the facing element 52 taking the wear. With this construction, when the holder-facing assembly 14—52 becomes excessively worn, due to excessive wear of the holder 14, the facing element 52, or both, this assembly may be replaced as a unit, including the tool 16 and the discharge nipple 42 or 48, which is an important feature. As will be discussed hereinafter, the tool 16 may be replaced independently, the tool wear being normally higher than the wear of the holder-facing assembly 14—52. It will be noted that the conduit 28, being located behind the shank 12, is shielded thereby so that wear of the conduit occurs at a very low rate.

Considering the manner in which the holder 14 is mounted on the shank 12, co-operating with the facing element 52 engaging the front side 54 of the shank 12 is a clamping element 56 engaging the rearward side 58 of the tool shank. The facing element 52 is secured by bolts 60 and 62, and the latter also extends through an opening 64 in the clamping element 56. The clamping element is angular in elevation and is provided with an opening 66 therethrough for a pin 68, or other means, for securing the clamping element and the holder 14 together. The openings 64 and 66 have the form of elongated slots, whereby the clamping element may be moved forwardly or rearwardly relative to the holder 14 to accommodate shank ends of different fore-and-aft thicknesses, the shank shown being of intermediate thickness. All will be apparent, to mount the holder-facing assembly 14—52 on a thicker shank, the clamping element 56 is displaced rearwardly relative to the holder 14, and to receive a thinner shank, the clamping is displaced forwardly, the effect of such forward and rearward movement of the clamping element being accommodated at the bolt 62 by the elongated opening or slot 64 in the clamping element. Thus, this means of mounting the holder 14 on the shank 12 accommodates shanks of different sizes, which is an important feature of the invention.

Considering the tool 16 and the manner in which it is mounted on the holder 14, the holder is provided at its forward end with a forwardly-facing and downwardly-and-forwardly inclined socket 72 which inclines the axis of the tool 16 downwardly and forwardly to enable the tool to draw itself downwardly into and hold itself in the ground, the depth being controlled by the position of the wheels on the frame 10 relative to the frame as hereinbefore suggested. The tool 16 includes a stem 74 which is inserted into the socket 72 and which is retained therein by a pin 76. The thrust applied to the tool 16 in use is transmitted directly to the holder 14 by providing the tool with a rearwardly-facing annular shoulder 78 which seats against the forward end of the holder, the forward end of the holder being inclined to match the inclination of the axis of the tool. Thus, the load applied to the tool is transmitted directly to the holder, the pinned stem 74 merely serving to prevent disengagement of the tool from the holder.

Considering the tool 16 in more detail, it includes a forwardly tapered or convergent tooth 80, the annular shoulder 78 being located at the junction of the rearward end of such tooth with the stem 74. The tooth 80 is provided on opposite sides thereof with wings 82 which are spaced apart circumferentially 180° and which extend generally horizontally from the tooth, the wings 82 extending substantially from the larger end of the tooth to the smaller end thereof. As best shown in FIG. 6, the wings 82 are so shaped as to provide the tool 16 with a plan form generally similar to the plan form of a delta-winged airplane.

The winged tooth 80 has an excellent earth shattering effect, thereby thoroughly shattering and loosening the earth ahead of the components located rearwardly thereof to provide for easier movement of the entire apparatus through the earth and to minimize wear of components located rearwardly of the tooth. The earth shattering effect provided by the winged tooth 80 results in a very substantial decrease in the power required to pull the apparatus through the earth, which is an important feature. Also, the wings 82, having a negative angle of attack due to the downward and forward inclination of the axis of the tool 16, tend to force the tool downwardly and hold it in the ground, which is a very desirable feature, particularly in hard ground which normally tends to force tools upwardly. Of course, as hereinbefore suggested, the depth at which the tool 16 runs may be controlled by adjusting the wheels of the frame 10 relative to the frame.

Although I have disclosed exemplary embodiments of my invention herein for purposes of illustration, it will be understood that various changes, modifications and substitutions may be incorporated in such embodiments without departing from the spirit of the invention as defined by the patent claims hereinafter appearing.

I claim as my invention:

1. In an apparatus for injecting a material into the earth, the combination of: a shank; an earth penetrating tool carried by said shank at the lower end thereof; a discharge means for the material carried by said shank at the lower end thereof and rearwardly of said tool, said discharge means having a socket; rigid conduit means extending downwardly into and slidable in said socket and located rearwardly of said shank; an O-ring between said conduit means and the wall of said socket to provide a fluid-tight seal therebetween; and means loosely interconnecting said shank and said conduit means for holding said conduit means in the downwardly extending direction.

2. In an apparatus for injecting a material into the earth, the combination of: a shank; an earth penetrating tool carried by said shank at the lower end thereof; a discharge means for the material carried by said shank at the lower end thereof and rearwardly of said tool; rigid conduit means extending downwardly to and communicating with said discharge means, said conduit means being located rearwardly of said shank; means loosely connecting said conduit means to said discharge means and providing a fluid-tight seal therebetween; and means loosely connecting said conduit means to said shank above said discharge means for relative movement in all horizontal directions whereby said shank may flex relative to said conduit means in all horizontal directions.

3. In an apparatus for injecting a material into the earth, the combination of: a shank; a holder carried by said shank at the lower end thereof; an earth penetrating tool carried by said holder at the forward end thereof; a discharge means for the material carried by said holder at the rearward end thereof; rigid conduit means extending downwardly, rearwardly of said shank, to and communicating with said discharge means; means providing a fluid-tight seal between said conduit means and said discharge means and loosely connecting said conduit means to said discharge means; and means above said holder and loosely connecting said conduit means to said shank for relative movement in all horizontal directions whereby said shank may flex relative to said conduit means in all horizontal directions.

4. An apparatus as defined in claim 3 wherein said holder is provided at its forward end with a forwardly facing socket, said tool having a stem disposed in said socket and having a shoulder seated against the forward end of said holder.

5. An apparatus as defined in claim 3 including a facing on the forward side of said shank carried by said holder.

6. In an earth working apparatus, the combination of: a shank; a tool holder adapted to be mounted on the lower end of said shank and adapted to have a tool mounted on the forward end thereof; and means for mounting said tool holder on the lower end of said shank, including elements respectively engageable with opposite sides of said shank, one of said elements being positionable in different positions relative to said tool holder and said shank to accommodate shanks of different thicknesses, and including means for securing said one element to said tool holder and said shank in different positions relative thereto.

7. An apparatus as defined in claim 6 wherein said positionable element engages the rearward side of said shank and wherein the other of said elements engages and forms a facing for the forward side of said shank and is rigidly connected to said tool holder.

References Cited in the file of this patent

UNITED STATES PATENTS

| | | |
|---|---|---|
| 428,895 | Davie | May 27, 1890 |
| 465,422 | Barton | Dec. 15, 1891 |
| 985,582 | Goodell | Feb. 28, 1911 |
| 1,525,960 | Seaholm | Feb. 10, 1925 |
| 1,808,974 | Wilkens | June 9, 1931 |
| 2,263,215 | Larsen | Nov. 18, 1941 |
| 2,285,932 | Leavitt | June 9, 1942 |
| 2,415,251 | Leavitt | Feb. 4, 1947 |
| 2,598,121 | Hannibal | May 27, 1952 |
| 2,625,870 | Peacock et al. | Jan. 20, 1953 |
| 2,660,939 | Pool et al. | Dec. 1, 1953 |
| 2,702,698 | Snyder et al. | Feb. 22, 1955 |
| 2,722,902 | Hyatt | Nov. 8, 1955 |
| 2,737,103 | Renault | Mar. 6, 1956 |
| 2,781,733 | Graham | Feb. 19, 1957 |
| 2,822,769 | Green | Feb. 11, 1958 |

FOREIGN PATENTS

| | | |
|---|---|---|
| 257,961 | Switzerland | May 2, 1949 |